United States Patent [19]

Goszczynski

[11] Patent Number: 5,221,165

[45] Date of Patent: Jun. 22, 1993

[54] CAMSHAFT BORE MACHINING METHOD AND APPARATUS

[75] Inventor: Allan A. Goszczynski, Shelby Township, Macomb County, Mich.

[73] Assignee: Litton Industrial Automation Systems, Inc., Florence, Ky.

[21] Appl. No.: 822,937

[22] Filed: Jan. 21, 1992

[51] Int. Cl.$^5$ ............................................ B23B 41/12
[52] U.S. Cl. ................................... 408/1 R; 82/1.11; 408/57; 408/83; 408/145
[58] Field of Search ............... 408/1 R, 80, 81, 83, 408/145, 57, 59; 82/1.11, 1.2

[56] References Cited

U.S. PATENT DOCUMENTS

| | | | |
|---|---|---|---|
| 4,279,550 | 7/1981 | Kress et al. | 408/59 |
| 4,693,642 | 9/1987 | Mair et al. | 408/83 X |
| 5,066,173 | 11/1991 | Gaffan et al. | 408/145 X |

*Primary Examiner*—Steven C. Bishop
*Attorney, Agent, or Firm*—Barnes, Kisselle, Raisch, Choate, Whittemore & Hulbert

[57] ABSTRACT

A method, machine tool and boring bar for machining bores in a series of concentric journals for a camshaft in a cylinder head or block of an engine. The boring bar has an elongate and cylindrical body with a single cutting insert at one end for machining all of the journals one at a time and a plurality of circumferentially spaced and longitudinally extending bearing pads on the body which, when the insert is machining one journal, are received in the previously machined journals to radially constrain and support the boring bar. The other end of the bar is received in a chuck or drive spindle of the machine tool which rotates and advances the boring bar through the journals to machine them. Each workpiece is located and clamped in the machine tool with its series of journals to be machined substantially concentric with the axis of rotation of the insert of the boring bar. The machine tool alternately rapidly advances and then slowly in-feeds the boring bar through each of the journals at the desired feed rate to machine it. After all the journals are machined, the boring bar is rapidly retracted and withdrawn from the workpiece.

20 Claims, 3 Drawing Sheets

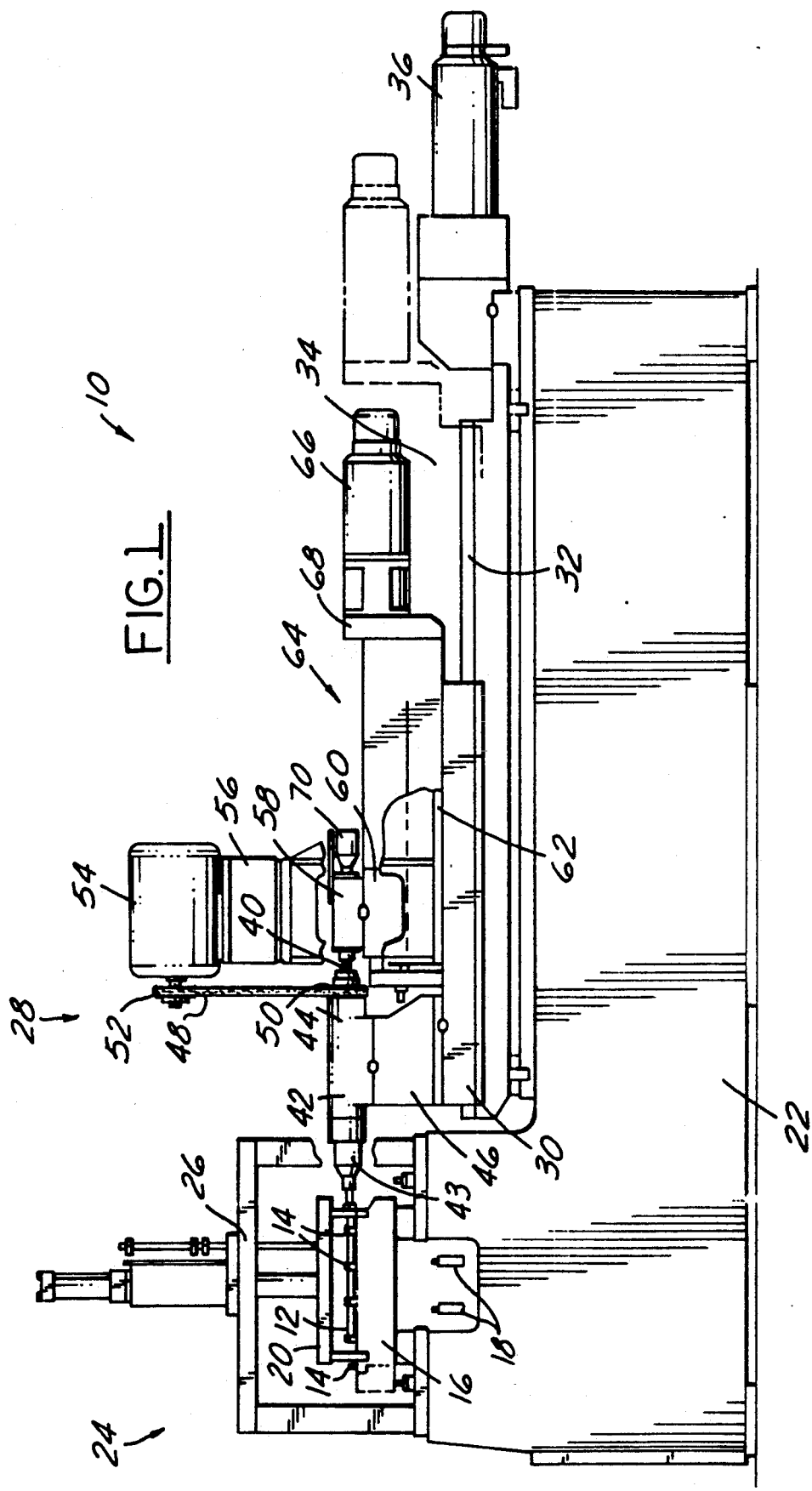

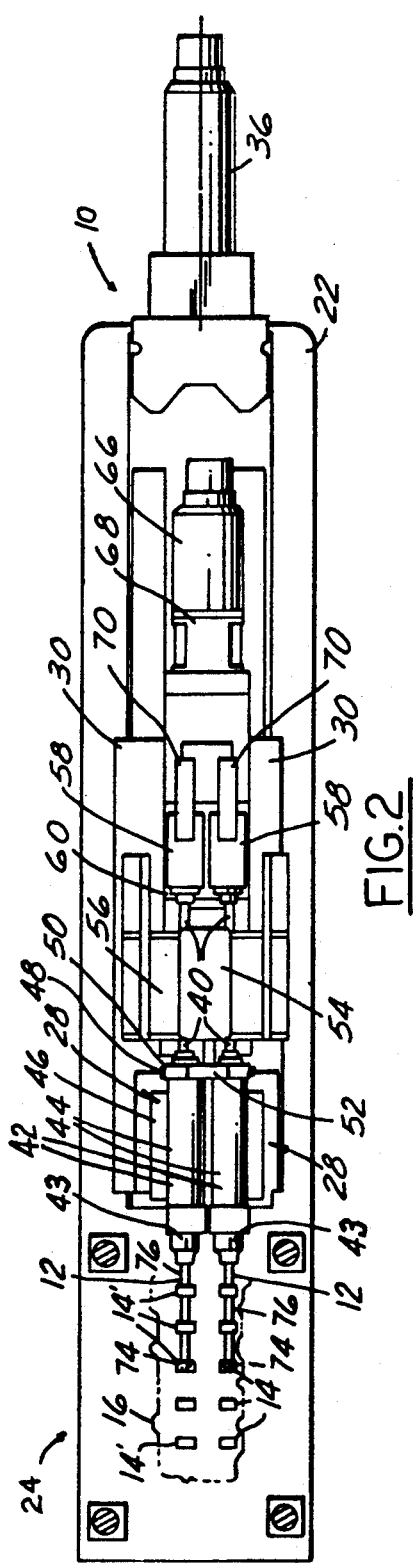
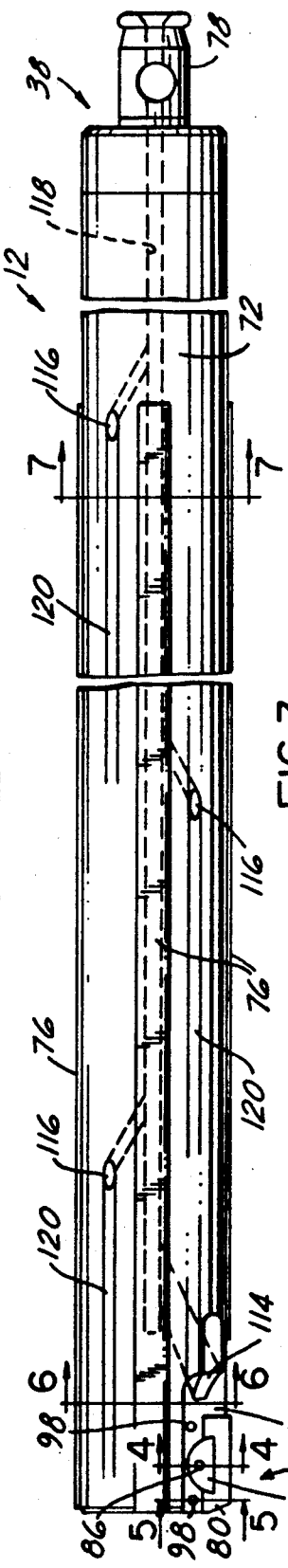
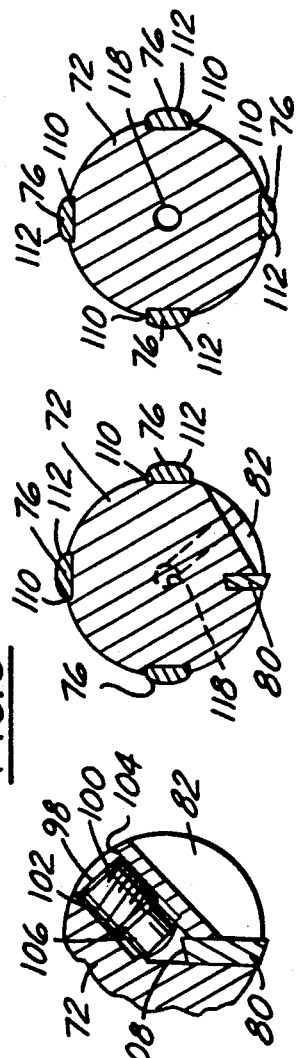
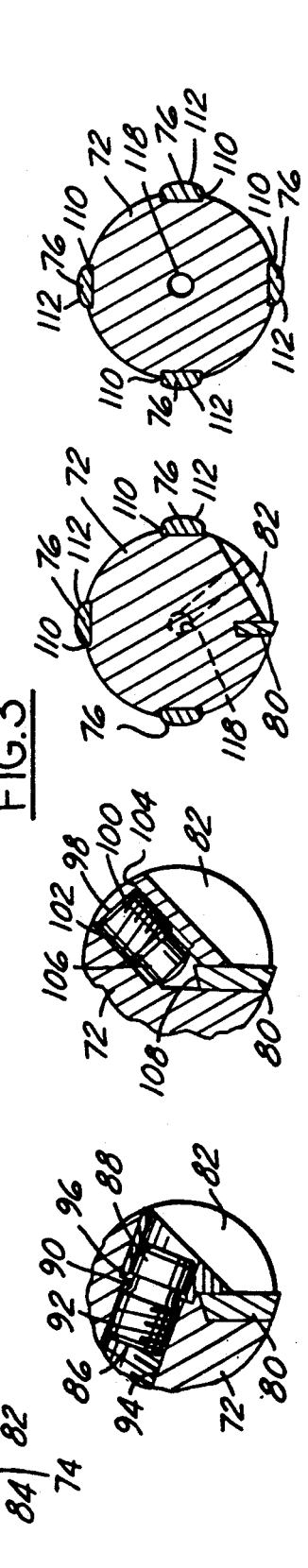

CAMSHAFT BORE MACHINING METHOD AND APPARATUS

FIELD OF THE INVENTION

This invention relates to boring holes in a workpiece and more particularly to a method and apparatus and tool for boring camshaft journals in internal combustion engine cylinder heads and blocks.

BACKGROUND

In modern day automotive design, parts are being machined to ever closer and more consistent tolerances to increase engine efficiency and reliability. In the machining of automotive internal combustion engine blocks and cylinder heads, a boring or reaming operation must be performed to produce two or more camshaft journal bores which act as load bearing surfaces for a rotating camshaft. Frequently, two horizontal boring machines operate in tandem to bore the journals for both the intake and exhaust camshafts nearly simultaneously.

A prior commonly known camshaft journal boring machine has a drive spindle and a slide for rotating and longitudinally reciprocating a generally cylindrical boring bar. The boring bar has a plurality of cutting inserts longitudinally spaced apart the distance between camshaft journals for simultaneously machining all journals concentric with the axis of rotation of the boring bar.

To bore a series of camshaft journals in a cylinder head, the cylinder head is transferred into a workstation of this boring machine. The platen of the boring machine is rapidly advanced toward the workpiece to advance the boring bar through the journal holes until each cutting insert is completely beyond its associated journal to be bored, and the distal end of the bar is received for rotation in a support bushing which radially constrains the end of the boring bar. Depending upon bar length and the required dimensional accuracy of the journal bores, a second independent support bushing may engage the boring bar near its middle to minimize boring bar flexure and tool chatter. The workpiece is then lowered onto locators and clamped in the workstation. This aligns the axis of rotation of the boring bar with the axes of the camshaft journals to be machined. If necessary, the individual cutting inserts are adjusted to the proper boring diameter. To simultaneously bore all the camshaft journals, the boring bar is rotated by the spindle while being out-fed by retraction of the slide. After the boring operation is completed, bar rotation is stopped, and the bar is latched or locked in a predetermined position to prevent bar rotation and to assure clearance between the inserts and the workpiece, when raised, to prevent the inserts from scarring or re-cutting the finished bores when the bar is retracted from the workpiece. To complete the machining cycle, the workpiece is unclamped and raised, the bar is released from all bushing supports and rapidly retracted to its starting position, the machined cylinder head is then transferred from the workstation and another cylinder head is transferred into the workstation to be machined.

This prior art machine for boring camshaft journals suffers from boring bar flexure, vibration and cutting tool chatter which results in machined journals having taper, concentricity, and roundness errors as well as poorer surface finish. Improper diametral adjustment of any of the cutting inserts can result in a series of camshaft journals bored to different diameters and tolerances causing premature camshaft or bearing failure, excessive vibration, or lubrication problems. Dynamic imbalance, producing boring bar vibration and chatter, causing concentricity, and out-of-roundness errors, is also common because the cutting inserts are axially aligned on the bar creating a non-uniform distribution of mass and cutting forces. An increased likelihood of chatter and excessive bar flexure also results from the long bar being inadequately radially constrained and having a substantially smaller diameter than the journal bore diameter.

The problems commonly encountered in this boring apparatus result in the costly scrapping of numerous cylinder heads or blocks. Even worse, defectively machined journals not detected by the inspection process will receive camshafts and be installed in internal combustion engines which in use may suffer excessive camshaft vibration, premature bearing failure, or poor or erratic engine timing which reduces engine efficiency, durability and reliability and increases engine warranty and repair costs.

SUMMARY OF THE INVENTION

A method, machine, and tool for boring a series of concentric camshaft journals in a cylinder head or block by using one or more previously bored journals to support and guide the boring tool in machining the next journal. The boring bar has one cutter for boring all the journals and two or more circumferentially spaced bearing pads extending longitudinally for radially constraining and supporting the bar within one or more machined journals to accurately guide the bar in boring the next journal. Preferably cutting and cooling fluid is discharged from ports in the bar adjacent the cutter and the bearing pad to dissipate heat, flush chips, prevent burnishing of the machined journal surfaces and lubricate and cool the rotating bearing pads contacting the machined journal surfaces.

In a boring machine, a cylinder head or block workpiece is located and clamped in a workstation, and then the rotating boring bar is alternately rapidly advanced and in-fed to machine each succeeding journal of the workpiece one at a time. After the first journal is machined, the boring bar is aligned and supported for machining each succeeding journal by the bearing pads being received in the previously machined journals of the workpiece. Cutting fluid is supplied to the boring bar while it is machining and rotating in the journals. After all of the series of journals are machined, the boring bar is rapidly retracted from the workpiece. The machined workpiece is unclamped and transferred from the workstation, and a new workpiece is transferred into and located and clamped in the workstation.

Objects, features, and advantages of this invention are to provide a method, machine and tool for boring a series of concentric camshaft journals which greatly reduces machining defects, simplifies machining set up, simplifies transfer, location and clamping of workpieces, utilizes a boring bar having one cutter at one end, eliminates support bushings radially constraining the end and an intermediate portion of the boring bar, virtually eliminates flexure, vibration and chatter of the boring bar, and taper, concentricity and out-of roundness errors in the machined bores, improves surface finish and provides a machine tool that is strong, simple, rugged, durable, of simple design, and economical manufacture.

BRIEF DESCRIPTION OF THE DRAWINGS

These and other objects, features, and advantages of this invention will be apparent from the following detailed description, appended claims, and accompanying drawings in which:

FIG. 1 is a side view of a camshaft boring machine partly broken away to show the spindle with the boring bar fully extended through the cylinder head.

FIG. 2 is a top plan view of the camshaft boring machine of FIG. 1.

FIG. 3 is a side view of the boring bar showing a cutting tool insert, bearing pads, and a cutting fluid passage and discharge ports.

FIG. 4 is an enlarged partial sectional view taken along line 4—4 illustrating the cutting insert and clamping mechanism.

FIG. 5 is an enlarged partial sectional view taken along lines 5—5 illustrating the mechanism for radially adjusting the cutting insert.

FIG. 6 is an end view of the boring bar showing the cutting insert and bearing pad arrangement.

FIG. 7 is a cross sectional view of the boring bar taken along the line 6—6 showing the bearing pad and fluid passage arrangement.

DETAILED DESCRIPTION

Figure 8:
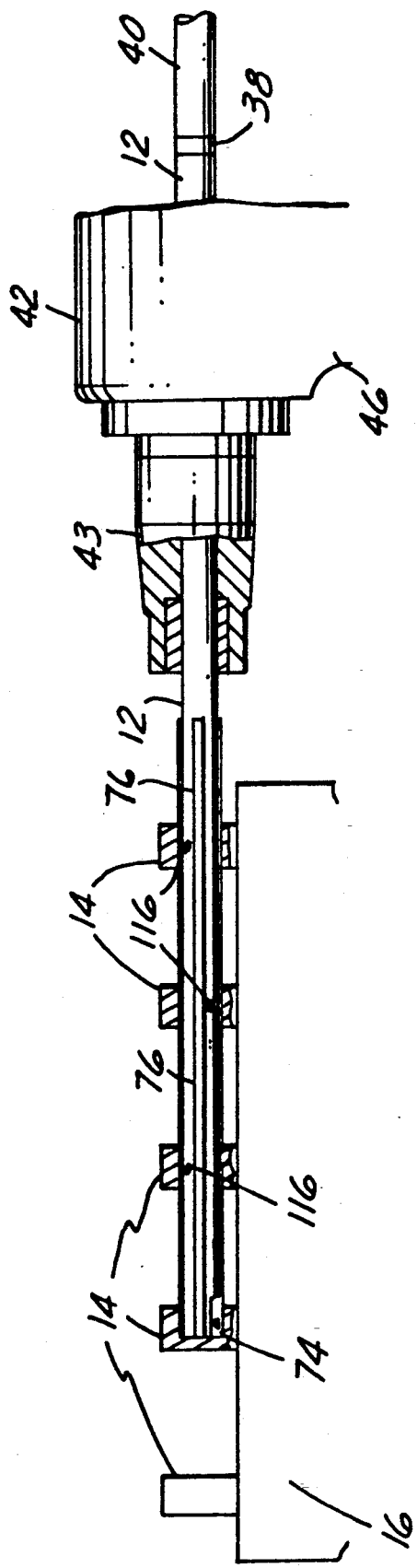
FIG. 8 is a longitudinal sectional view through a cylinder head illustrating the guide bushing and bored journals rotatably radially constraining and supporting the boring bar as it machines the following camshaft journal.

Referring in more detail to the drawings, FIGS. 1 and 2 illustrate a machine tool 10 and two side-by-side boring bars 12 embodying this invention for boring two series of journals 14, 14' of a workpiece 16 when accurately positioned on locators 18 and rigidly clamped by a fixture 20 carried by a base 22 of the machine tool. A series of the workpieces are advanced into and out of a workstation 24 of the machine tool 10 by a suitable transfer mechanism, such as a lift and carry transfer 26. To machine the workpiece, each boring bar 12 is rotated and fed into the workpiece 16 nearly simultaneously by a corresponding drive assembly 28. To rapidly advance and retract the side-by-side drive assemblies 28, they are carried by a single platen 30 slidably received on ways 32 fixed to the base 22. The platen 30 is reciprocated longitudinally by a ball screw and nut assembly 34 driven by a servomotor 36 and secured to the base 22.

Each drive assembly 28 has a chuck 38 fixed to a splined shaft 40 slidably received for rotation therewith in a complimentary spindle or quill 42 and a guide bushing 43 journalled for rotation in a spindle 44 with a guide bushing 45 mounted on a support 46 secured to the platen 30. To rotate both boring bars 12, both quills 42 are simultaneously driven through a timing belt 48 and cog pulleys 50 & 52 by an electric motor 54 mounted on a platform 56 secured to the platen 30. For axially advancing and retracting both boring bars 12, in tandem, shafts 40 are journalled for rotation in and longitudinal movement with a housing 58 jointly secured to a common slide 60 received for longitudinal reciprocation on ways 62 fixed to the platen 30. The slide 60 and hence both boring bars 12 are advanced and retracted relative to each spindle 44 by a ball screw and jack assembly 64 driven by a servomotor 66 and mounted on a support 68 fixed to the platen 30. A coolant is supplied to both boring bar 12 through a flexible hose (not shown) connected to a coupling 70 communicating with a central bore (not shown) through the driven shaft 40 which communicates with a fluid passage in each bar 12.

FIG. 3 illustrates a boring bar 12 of the invention having an elongate body 72 with a single cutter assembly 74 adjacent one end, a plurality of circumferentially spaced and longitudinally extending bearing pads 76, and a male connector 78 on the other end compatible with the chuck 38. The body 72 is an elongate and cylindrical shaft of steel, preferably of a steel known in the trade as Mallory or a heat treated and hardened tool steel. Preferably, the connector 78 is of the type used with a quick change chuck, such as a KOMET ABS quick change connector.

To machine each journal, the cutter assembly 74, as shown in FIGS. 2 & 3, has a single cutting insert 80 releasably secured in a pocket 82 in the body 72 by a clamp plate 84 and a lock screw 86. The cutting insert 80 may be of tungsten carbide and preferably when machining aluminum has a polycrystalline diamond tip brazed onto a carbide body to provide increased cutting life. The lock screw 86 has a head 88 with a hexagonal socket, a central groove 90 and a threaded shank 92 received in a complementarily threaded transverse bore 94 through the body 72. A retainer washer 96 encircles the groove 90 in the lock screw 86 and is brazed to the bottom of the clamp plate 84. As the lock screw 86 is threaded into the body 72 of the boring bar 12, it draws the clamp plate 84 into firm engagement with the cutting insert 80 to releasably secure it in the pocket 82 in the boring bar 12.

Within limits, the diameter of the journal bore machined by the cutting insert 80 can be varied and adjusted by a pair of longitudinally spaced apart adjustment screws 98. As shown in FIG. 4, each adjustment screw 98 has a head 100 with a hexagonal socket and a threaded periphery 102 received in a complementarily threaded transverse blind counter bore 104 in the body 72. Each screw 98 has an off-center conical tip 106 providing a cam engaging the back edge 108 of the cutting insert 80. To shift the insert 80 generally radially and hence adjust the diameter of the bore it machines, the lock screw 86 is rotated to release the insert 80, the adjustment screws 98 are rotated to shift the insert 80, and the lock screw 86 is tightened to secure the insert 80 in the pocket 82 with its rear edge 108 bearing on the set screws 98.

In use, the bearing pads 76 radially constrain and support the boring bar 12 as it machines a series of longitudinally spaced apart journals 14 in a workpiece 16. Preferably, the bearing pads 76 are equally circumferentially spaced around the periphery of the body 72 and received in longitudinally extending grooves 110 in the body 72. Preferably, the pads 76 are attached to the body 72 by brazing, although they may be adhesively secured in the grooves 110. The pads 76 project radially outwardly of the body 72 and have an arcuate peripheral surface 112 with a diameter substantially equal to the diameter of the bore machined by the cutting insert 80 and a center coincident with the axis of rotation of the boring bar 12. Preferably, the diameter of the bore machined by the cutting insert 80 is not more than about 0.003 of an inch greater than the diameter of the peripheral surfaces 112 of the pads 76. The diameter of the peripheral surface 112 cannot be greater than the diameter of the bore machined by the cutting insert 80.

To provide bearing surfaces supporting the boring bar 12 while machining all of the journals 14 of the workpiece 16, preferably each pad 76 is of sufficient longitudinal length so that in use it bears on the first journal machined by the boring bar 12 while it is machining the last journal in the series of journals 14 machined by the boring bar 12. Typically, the longitudinal length of each pad 76 is somewhat greater than the longitudinal or axial distance from the first to the last journal 14 to be machined of the workpiece 16. Usually, each pad 76 is at least half as long as the body of the boring bar 12. Preferably, each bearing pad 76 is of carbide although a cermet, silicon carbide or other relatively hard and wear resistant material can be used.

Cutting and cooling fluid is supplied to both the cutting insert 80 through a discharge port 114 and the machined journal bores in which the boring bar 12 rotates through a plurality of discharge ports 116 each connected to a common supply passage 118 extending from one end axially into the body 72 of the boring bar 12. Preferably, the ports 116 are spaced apart longitudinally a distance approximately equal to the longitudinal distance between adjacent cam shaft journals 14 so that in use cutting fluid is simultaneously discharged onto all of the machined journals 14 in which the boring bar 12 is received. This both supplies cutting fluid to the journal 14 being machined and to all the other journals 14 engaged by the bearing pads 76 to lubricate and cool them and prevent burnishing and scoring of the machined surfaces. Preferably, each discharge port 116 has, emanating forwardly, a longitudinal channel 120 in the bar 12 peripheral surface generally extending the distance between two journals 14 for more evenly distributing cutting fluid across the machined journal 14 and to provide clearance between the bar 12 and journal 14 for relieving cutting fluid pressure. Discharge port 114 supplies cutting fluid directly adjacent cutting assembly 74 to cool the insert 80, improve chip flow during machining, flush chips out of the journal being machined, and lubricate the cutting interface for consistent, good surface finish.

In use, the cutting insert 80 is adjusted to machine the desired diameter of the journal bores and the boring bar 12 is received in the chuck 38 of the drive assembly 28 of the boring machine. With both the slide 60 and the platen 30 in their fully retracted positions, (shown in phantom in FIG. 1), a cylinder head workpiece 16 is transferred into the workstation 24 by the transfer mechanism 26. The workpiece 16 is located on the locators 18 and securely clamped in the workstation 24 by the holding fixture 20 with the axes of the camshaft journals 14 substantially concentrically aligned with the axis of rotation of the boring bar 12. The boring bar 12 and drive assembly 28 are rapidly advanced toward the first journal by energizing the servomotor 36 to move the platen 30 to its extended position as shown in FIG. 1 positioning the insert 80, spindle 42 and guide bushing 43 immediately adjacent the first journal 14 to minimize the length of unsupported bar 12 between the spindle 42 and workpiece 16. To rotate the boring bar 12, the electric motor 54 is energized, and to provide lubrication and cooling, a cutting fluid is supplied through the coupling 70 to the boring bar 12 and discharged through its outlet ports 114, 116.

To machine the first journal 14, each rotating cutting bar 12 is slowly in-fed at the desired cutting feed rate by energizing servomotor 66 to advance the slide 60 and hence each bar 12 through its corresponding spindle 42 into the workpiece 16. After the machining of each first journal 14 is completed, the servomotor 66 alternately rapidly advances and then slowly in-feeds the slide 60 and hence both rotating boring bars 12 to substantially simultaneously machine two series of concentric camshaft journals 14 in a single fixtured workpiece. The servomotor 66 is operated at a relatively high speed for the rapid advance and a relatively low speed for the in-feed to machine each journal 14.

After all of the journals 14 in each of the series have been machined, both boring bars 12 are fully retracted by energizing both of the servomotors 36 and 66 to retract and return both the platen 30 and the slide 60. Preferably, to minimize scoring or marking of the machined journals by the cutting insert 80, the drive motor 54 is de-energized to stop rotation of both boring bars 12 before they are retracted. Preferably, the supply of cooling fluid is also interrupted and turned off while the boring bars 12 are retracted. After both boring bars 12 are retracted, the machined workpiece 16 is unclamped and released by the fixture 20 and then transferred out of the workstation 24 by the transfer mechanism 26. Normally, the transfer mechanism 26 also transfers into the workstation 24 another workpiece to be machined. Thereafter, the locating, clamping and machining cycle may be repeated on the new workpiece.

As shown in FIG. 8, after the first journal 14 in the workpiece has been machined, the boring bar 12 is radially constrained and supported as it machines each succeeding journal 14 by the previously machined journal or journals. This enables the camshaft bore to be machined with closer tolerances and less error in concentricity, out-of-roundness, taper and diameter and with improved surface finish all without requiring the use of any support bushing on the distal end and intermediate portion of the boring bar 12. These benefits are achieved regardless of the number of journals 14 to be bored hence the required length of the boring bar 12. With this arrangement, the same cutting insert machines all of the journals 14 and it is always supported by at least the immediately adjacent preceding machined journal 14.

It is also within the scope of this invention to use a single boring bar 12 rotatably housed and supported by a single quill 42 and fed into the workpiece 16 through a single spindle 42 and guide bushing 43 by a single housing 58 on a slide 60 to machine a single series of concentric camshaft journals 14 in a single fixtured workpiece 16 such as a cylinder head with a single series of concentric journals for receiving a single camshaft having both intake-and exhaust-valve cams for use in a single overhead cam engine.

As only one preferred embodiment of the invention has been disclosed, it will be understood that there may be modifications, variations, changes in and other embodiments of the invention which fall within the spirit, scope and fair meaning of the following claims.

I claim:

1. A method of machining in a workpiece a series of longitudinally spaced apart journals for a camshaft of an engine comprising, providing a boring bar with an axially elongate body with a single cutting insert carried by the body immediately adjacent one end of the body, the other end of the body being constructed and arranged to be received in a driving spindle for rotating the boring bar about a longitudinal axis of rotation, a plurality of circumferentially spaced apart and longitudinally extending bearing pads carried by the body and extending longitudinally from adjacent such one end of the body at least one-half of the longitudinal extent of the body, and the bearing pads having arcuate outer peripheral surfaces concentric with the axis of rotation of the boring tool, and having a diameter not greater than and only slightly less than the diameter of the bore machined by the cutting insert of the boring bar, locating and clamping the workpiece so that the axes of its series of journals to be machined are substantially concentric with the axis of rotation of the boring bar, rotating the boring bar while in-feeding the insert through each journal in succession of the series of journals of the workpiece to machine each journal with the bearing pads being received in at least the immediately preceding journal machined by the insert to radially constrain and support the rotating boring bar, and after all of the journals in the series have been machined by the same cutting insert, retracting and withdrawing the boring bar from the workpiece, and thereafter unclamping and transferring the machined workpiece.

2. The method of claim 1 wherein the bearing pads are of sufficient longitudinal length so that as the cutting insert is in-fed through each journal of the series to machine it the bearing pads are received in all of the journals previously machined by the cutting insert to radially constrain and support the boring bar.

3. The method of claim 1 which also comprises stopping rotation of the boring bar after the cutting insert has been fed into and machined all of the journals in the series and while the boring bar is being retracted from all the machined journals.

4. The method of claim 1 wherein the boring bar is alternately rapidly advanced toward and in-fed into each journal and the rate of rapidly advancing the boring bar is at least five times greater than the rate of in-feeding the boring bar to machine the journals.

5. The method of claim 1 which also comprises applying cutting and cooling fluid to both each journal as it is machined by the cutting insert and each previously machined journal in which the bearing pads are received at least while the boring bar is rotating in such journals.

6. A machine tool for machining in a workpiece a series of longitudinally spaced apart journals for a camshaft for an engine comprising: a base, a drive carried by said base for rotating a boring bar and longitudinally reciprocating the boring bar relative to the base, a boring bar having an axially elongate body having a single cutting insert immediately adjacent one end of said body for machining one at a time the journals of the series of longitudinally spaced apart journals of the workpiece, said elongate body being constructed and arranged to be connected adjacent its other end to said drive to rotate said cutting insert about an axis of rotation, and a plurality of longitudinally extending bearing pads circumferentially spaced about the periphery of said body, carried by said body and extending longitudinally from adjacent such one end of said body at least one half of the longitudinal extent of said body, and bearing pads having arcuate peripheral surfaces with a center coincident with an axis of rotation of said cutter insert and a diameter not greater than and only slightly smaller than the diameter of the bore machined by the cutting insert when rotated by said drive, a workpiece locator carried by the base, a clamp mechanism associated with said locator and constructed and arranged to clamp the located workpiece with the axes of its series of journals to be machined substantially coincident with the axis of rotation of said cutting insert of said boring bar, and an actuator associated with said drive and constructed and arranged to in-feed the cutting insert of the boring bar toward and through each of the workpieces while the insert is rotating to sequentially machine one at a time a bore through each of journals of the series with the same cutting insert and to dispose the bearing pads in at least the immediately preceding journal machined by the cutting insert to radially constrain and support the boring bar while the cutting insert is machining at least the immediately succeeding journal of the series.

7. The machine tool of claim 6 wherein said longitudinally extending bearing pads are of sufficient length so that when the cutting insert is machining the last journal of the series the bearing pads extend through the first journal of the series machined by the cutting insert and all of the intervening journals of the series machined by the cutting insert to radially constrain and support the boring bar while the cutting insert is machining such last journal of the series.

8. The machine tool of claim 6 wherein said body of the boring bar has a diameter which is at least nine-tenths of the diameter of the bore machined by said insert of boring bar.

9. The machine tool of claim 6 wherein the diameter of the bore machined by said cutting insert of the boring bar is not more than 0.003 of an inch greater than the diameter of said bearing pads of the boring bar.

10. The machine tool of claim 6 wherein the boring bar also comprises a plurality of discharge ports in said body of said boring bar, at least some of said ports being longitudinally spaced apart for discharging cooling fluid into both the journal being machined by said cutting insert of the boring bar and each of the machined journals in which the bearing pads of boring bar are received.

11. The machine tool of claim 6 wherein the boring bar also comprises a pocket in said body adjacent said one end of said body, clamp means received in said pocket, and said insert is removably received in said pocket and releasably secured therein by said clamp means.

12. The machine tool of claim 6 which also comprises a guideway carried by said base, a platen carried by said guideway for longitudinal reciprocation therealong on an axis parallel to the axis of rotation of said cutting insert of the boring bar, said drive for said boring bar being carried by said platen for reciprocation with said platen, and a drive connected to said platen for moving said platen to a first position to rapidly advance said boring bar toward the first journal of the series of journals of the workpiece to be machined by said cutting insert of the boring bar, and to a second position spaced from said first position to rapidly retract and withdraw the boring bar from the workpiece after the boring bar has machined all of the journals in the series.

13. The machine tool of claim 6 wherein said insert of said boring bar has a polycrystalline diamond tip.

14. The machine tool of claim 6 wherein said insert of said boring bar consists essentially of one of tungsten carbide and silicon carbide.

15. The machine tool of claim 6 which also comprises a second drive for rotating a second boring bar and reciprocating such second boring bar relative to the base, and a second boring bar having an axially elongate body having a cutting insert immediately adjacent one end of said body for machining one at a time the journals of the series of longitudinally spaced apart journals of the workpiece, said elongate body being constructed and arranged to be connected adjacent its other end to said second drive to rotate said cutting insert about an axis of rotation, and a plurality of longitudinally extending bearing pads circumferentially spaced about the periphery of said body and carried by said body, said bearing pads having an arcuate peripheral surface with a center coincident with an axis of rotation of said cutter insert and a diameter not greater than and only slightly smaller than the diameter of the bore machined by the cutting insert when rotated by said second drive, said actuator is also associated with said second drive, and wherein each of said boring bars machine a separate series of journals of the same workpiece one at a time seriatim with both series of journals being machined at substantially the same time.

16. A boring bar for machining in a workpiece a series of longitudinally spaced apart journals for a camshaft of an engine, comprising: an axially elongate and generally cylindrical body, a single cutting insert carried by said body immediately adjacent one end thereof and constructed and arranged to machine a bore through one journal at a time when said body is rotated and in-fed through such journals, connector means adjacent the other end of said body constructed and arranged for coupling said body to a spindle for rotating said body and in-feeding said cutting insert through each of the journals one at a time to machine with the same cutting insert a bore through each of the journals of the series of the workpiece, a plurality of bearing pads circumferentially spaced about and carried by said body with each pad extending longitudinally from adjacent said one end of said body at least one half of the longitudinal extent of said body, and said bearing pads having arcuate outer peripheral surfaces concentric with the axis of rotation of the boring bar and having a diameter not greater than and only slightly less than the diameter of the bore machined by said cutting insert of the boring bar so that when said cutting insert machines each journal in the series said pads extend through all the preceding journals machined by said cutting insert to radially constrain and support the boring bar while said cutting insert machines such each journal.

17. The boring bar of claim 16 wherein said body of said boring bar has a diameter which is at least 9/10 of the diameter of the bore machined by said insert of the boring bar.

18. The boring bar of claim 16 wherein the diameter of the bore machined by said cutting insert of the boring bar is not more than 0.003 of an inch greater than the diameter of said bearing pads of the boring bar.

19. The boring bar of claim 16 which also comprises a plurality of discharge ports in said body of said boring bar, at least some of said discharge ports being longitudinally spaced apart for discharging cooling fluid into both the journal being machined by said cutting insert of the boring bar and each of the machined journals in which said bearing pads of the boring bar are received.

20. The boring bar of claim 16 which also comprises a pocket in said body adjacent said one end of said body, clamp means received in said pocket, and said insert is removably received in said pocket and releasably secured therein by said clamp means.

* * * * *